3,711,441
THERMAL OXIDATIVELY STABLE POLY-
CARBONATE COMPOSITION
Frank N. Liberti, Mount Vernon, Ind., assignor to
General Electric Company
No Drawing. Filed Jan. 3, 1972, Ser. No. 215,210
Int. Cl. C08g 17/13
U.S. Cl. 260—47 XA 4 Claims

ABSTRACT OF THE DISCLOSURE

A thermal oxidatively stable polycarbonate composition consisting of the reaction product of biphenol-A, a carbonate precursor and a minor amount of a monochlorophosphine and to a process for preparing the stable polymer composition which consists of adding 0.0005 to about 0.1 mole of a monochlorophosphine per mole of bisphenol-A to the reaction medium.

---

This invention relates to thermal oxidatively stable polycarbonate compositions and more particularly to polycarbonate compositions having minor amounts of particular phosphorous containing compounds that are actually in the polymer chain and to a process for preparing the thermal oxidatively stable polycarbonate compositions hereafter described.

BACKGROUND OF THE INVENTION

While it is known to incorporate phosphorous into a polymer chain as disclosed by U.S. Pat. 3,378,523 and in the publication by G. S. Kolesnikov et al. Vysokomol.soyed. A-9, No. 10, pages 2246–2249, 1967, none of these references discloses the use of minor amounts of phosphorous containing material to be incorporated into the polymer chain to achieve greatly enhanced thermal stability without otherwise changing the nature of the polycarbonate. Due to the use of increased molding temperatures with polycarbonate resins, the exposure of molded shapes to higher temperatures has become more important to preparing polycarbonates having increased stability to thermal degradation or discoloration when exposed to elevated temperatures.

DESCRIPTION OF THE INVENTION

It has now been surprisingly discovered that by incorporating minor amounts of a particular phosphorous containing material into the polymer, thermally stable polycarbonates are obtained. More specifically, the phosphorous material is a monochlorophosphine having the general formula:

wherein $R_1$ and $R_2$ may be independently selected from the group consisting of aryl, haloaryl, alkyl, cycloalkyl, aralkyl and alkaryl radicals of 1–25 carbon atoms.

More particularly, the monochlorophosphine is added to reaction medium in which a dihydric phenol such as 2,2-bis(4-hydroxyphenyl) propane (hereinafter referred to as bisphenol-A) and a carbonate precursor such as carbonyl chloride. The monofunctional phosphorous compound of this invention acts as a chain terminator and thus may control the molecular weight of the polymer. The process consists of preparing the thermally oxidatively stable polymer by reacting bisphenol-A, a carbonate precursor and the monochlorophosphine in an organic medium such as methylene chloride and in the presence of a catalyst and an acid acceptor. The amount of the monochlorophosphine to be reacted is 0.0005 to about 0.1 mole thereof per mole of bisphenol-A.

As stated previously, the phosphorous containing compounds are typically represented by the formula set forth previously and $R_1$ and $R_2$ therein may be alkyl such as methyl, ethyl, n-propyl, isopropyl, n-butyl, sec-butyl, tertiary-butyl, n-amyl, isoamyl, tertiary amyl, n-hexyl, dodecyl, nonyl, etc., cycloalkyl such as cyclohexyl, 2-methylcyclohexyl, 4-methylcyclohexyl, 2-ethylcyclohexyl, 4-ethylcyclohexyl, 4-isopropylcyclohexyl, etc., aryl such as phenyl, naphthyl, 1-naphthyl, 2-naphthyl, biphenyl, terphenyl, etc.; haloaryl such as 2-chlorophenyl, 2,4,6-trichlorophenyl, 2,4,6-tribromophenyl, etc.; aralkyl such as benzyl, phenylethyl, 2-phenyl-ethyl, 1-phenyl-propyl, 2-phenylpropyl, etc.; and alkaryl such as p-tolyl, m-tolyl, O-tolyl, 2,6-xylyl, p-cumyl, m-cumyl, n-cumyl, mesityl, p-tertiary butylphenyl, etc. In place of the diphenylchlorophosphine employed in the examples, dibutylchlorophosphine, di-2-ethyl-hexyl chlorophosphine, di-2,6-xylyl chlorophosphine, di-cyclohexyl chlorophosphine and dibenzyl chlorophosphine have been used with essentially the same results. In the practice of this invention, the preferred monochlorophosphine is diphenyl chlorophosphine.

The dihydric phenols that can be employed herein to prepare the polymer of this invention are bisphenols such as bis(4-hydroxyphenyl) methane, 2,2-bis(4-hydroxyphenyl) propane, 2,2-bis(4-hydroxy-3-methylphenyl) propane, 4,4-bis(4-hydroxyphenol) heptane, 2,2-bis(4-hydroxy-3,5-dichlorophenyl) propane, 2,2-bis(4-hydroxy-3,5-dibromophenyl) propane, etc., dihydric phenol ethers such as bis(4-hydroxyphenyl) ether, bis(3,5-dichloro-4-hydroxyphenyl) ether, etc., dihydroxydiphenols such as p,p'-dihydroxyphenyl, 3,3'-dichloro-4,4'-dihydroxydiphenyl, etc. dihydroxyaryl sulfones such as bis(4-hydroxyphenyl) sulfone, bis (3,5-dimethyl-4-hydroxyphenyl) sulfone, etc., dihydroxy benzenes, resorcinol, hydroquinone, halo- and alkyl-substituted dihydroxy benzenes such as 1,4-dihydroxy-2-chlorobenzene, 1,4-dihydroxy-2,5-dichlorobenzene, 1,4-dihydroxy-3-methylbenzene, etc., and dihydroxy diphenyl sulfoxides such as bis(4-hydroxyphenyl) sulfoxide, bis(3,5 - dibromo - 4 - hydroxyphenyl) sulfoxide, etc. A variety of additional dihydric phenols are also available to provide carbonate polymers and are disclosed in U.S. Pats. 2,999,835, 3,028,365 and 3,153,008. It is of course possible to employ two or more different dihydric phenols or a copolymer of a dihydric phenol with glycol or with hydroxy or acid terminated polyester, or with a dibasic acid in the event a carbonate copolymer or interpolymer rather than a homopolymer is desired for use in the preparation of the aromatic carbonate polymers of this invention.

The carbonate precursors employed in the practice of this invention can be either a carbonyl halide or a bishaloformate. The carbonyl halides which can be employed herein are carbonyl chloride, carbonyl bromide and mixtures thereof. The bishaloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride also known as phosgene is preferred.

As stated previously, the reaction may be carried out in the presence of an acid acceptor which may be either an organic or an inorganic compound. A suitable organic acid acceptor is a tertiary amine and includes such materials as pyridine, triethylamine, dimethylaniline, tributylamine, etc. The inorganic acid acceptor may be one which can either be a hydroxide, a carbonate, a bicarbonate or a phosphate of an alkali or alkaline earth metal.

Molecular weight regulators, which are also employed in carrying out the process for preparing the aromatic polycarbonate resins, can be such molecular weight regulators as phenol, cyclohexanol, methanol, para-tertiary-butylphenol, para-bromophenol, etc. Preferably, para-tertiarybutylphenol is employed as the molecular weight regulator.

DESCRIPTION OF THE PREFERRED EMBODIMENT

The following examples are set forth to illustrate more clearly the principle and practice of this invention to those skilled in the art. Unless otherwise specified, where parts or percents are mentioned, they are parts or percents by weight.

EXAMPLE I

To a reactor fitted with a reflux condenser and mechanical agitator charge 342 ml. of dry methylene chloride, 57.1 grams of 2,2-bis(4-hydroxyphenyl)-propane, 53.2 grams of calcium hydroxide, 1.0 gram of p-tertiary butylphenol and 9.4 microliters of tri-ethylamine. The slurry is stirred and phosgene is added at a rate of about 0.5 gram per minute. After 45 minutes, the endpoint is reached and the phosgene addition is terminated. The polycarbonate in solid form is recovered by filtering and evaporation of the solvent. The polycarbonate is dried for 48 hours at 225° F.

The polycarbonate is designated as I.

EXAMPLE II

To a reactor fitted with a reflux condenser and mechanical agitator, charge 342 ml. of dry methylene chloride, 57.1 grams of 2,2-bis(4-hydroxyphenyl)-propane, 53.2 grams of calcium hydroxide, 9.4 microliters of triethylamine and 1.85 grams of diphenyl chlorophosphine. The slurry is stirred and phosgene is added at a rate of about 0.5 gram per minute. After 45 minutes, the endpoint is reached and the phosgene addition terminated. Polycarbonate in solid form is recovered as in Example I. Elemental phosphorous content of the polycarbonate is 0.15 weight percent by atomic absorption spectroscopy.

The polycarbonate is designated as II.

EXAMPLE III

Example I is repeated except that 0.2 gram of diphenyl chlorophosphine is employed herein. Elemental phosphorous content of the polycarbonate is 0.02 weight percent.

The polycarbonate is designated as III.

EXAMPLE IV

Three and a half (3.5) grams each of the compositions of Examples I–III are sealed in a combustion tube under a pressure of 25 inches of mercury. The tubes are heated in an aluminum block at 600° F. for 15 minutes. The tubes are then cooled and the contents thereof are dissolved in 25 ml. of distilled methylene chloride. The percent transmission through the solutions is measured against the percent transmission through distilled methylene chloride at 425 nanometers. The higher the transmission, the lower is the discoloration of the polymer which in turn means better thermal stability of the polymer to discoloration. The results are as follows:

TABLE I

| Sample | Percent transmission |
| --- | --- |
| I | 86 |
| II | 92 |
| III | 90 |

The transmission is measured through a 23 mm. cell in a Fischer Electrophotometer.

As clearly shown from the examples the mere reacting of a monochlorophosphine with the dihydric phenol and carbonate precursor produces a polycarbonate having excellent resistance to discoloration upon exposure to elevated temperatures. In the higher amounts of the additive monochlorophosphine, the additive acts as a molecular weight regulator and terminates the polymer chains as such. Thus when using higher amounts of the monochlorophosphine, there is no need for the use of other molecular weight regulators. This is shown in Example II.

It will thus be seen that the objects set forth above among those made apparent from the preceding description are efficiently attained, and since certain changes may be made in carrying out the above process and in the composition set forth without departing from the scope of this invention, it is intended that all matters contained in the above description shall be interpreted as illustrative and not in a limiting sense.

What is claimed is:

1. A thermal oxidatively stable polycarbonate composition which is the residue of the condensation reaction of bisphenol-A, a carbonate precursor and a minor amount of a monochlorophosphine of the formula

$R_1$ and $R_2$ are independently selected from the group consisting of aryl, haloaryl, alkyl, cycloalkyl, aralkyl and alkaryl radicals of 1–25 carbon atoms wherein the composition contains 0.0005 to about 0.5 weight percent of elemental phosphorus.

2. The composition of claim 1 wherein the monochlorophosphine is diphenyl chlorophosphine.

3. In a process for preparing a thermally oxidative stable carbonate polymer by reacting bisphenol-A with a carbonate precursor in the presence of an acid acceptor, and a catalyst, the improvement which consists of adding to the reaction medium about 0.0005 to about 0.1 mole per mole of bisphenol-A of a monochlorophosphine of the formula

$R_1$ and $R_2$ are independently selected from the group consisting of aryl, haloaryl, alkyl, cycloalkyl, aralkyl and alkaryl radicals of 1–25 carbon atoms.

4. The process of claim 3 wherein the monochlorophosphine is diphenyl chlorophosphine.

References Cited

UNITED STATES PATENTS

| | | | |
| --- | --- | --- | --- |
| 3,378,523 | 4/1968 | Caldwell et al. | 260—47 |
| 3,578,634 | 5/1971 | Bialous et al. | 260—47 |

SAMUEL H. BLECH, Primary Examiner

U.S. Cl. X.R.

260—49